(12) United States Patent
Hegner et al.

(10) Patent No.: US 9,038,987 B2
(45) Date of Patent: May 26, 2015

(54) FLAP ASSEMBLY, IN PARTICULAR EXHAUST GAS FLAP ASSEMBLY

(75) Inventors: Ronald Hegner, Friedrichshafen (DE); Andreas Thoss, Markdorf (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 609 days.

(21) Appl. No.: 13/257,646

(22) PCT Filed: Mar. 16, 2010

(86) PCT No.: PCT/EP2010/001646
§ 371 (c)(1),
(2), (4) Date: Sep. 20, 2011

(87) PCT Pub. No.: WO2010/108620
PCT Pub. Date: Sep. 30, 2010

(65) Prior Publication Data
US 2012/0007008 A1    Jan. 12, 2012

(30) Foreign Application Priority Data
Mar. 24, 2009  (DE) .......................... 10 2009 014 140

(51) Int. Cl.
| | |
|---|---|
| *F02D 9/10* | (2006.01) |
| *F16K 1/22* | (2006.01) |
| *F02D 9/04* | (2006.01) |
| *F02D 9/06* | (2006.01) |

(52) U.S. Cl.
CPC ................ *F02D 9/106* (2013.01); *F16K 1/224* (2013.01); *F02D 9/04* (2013.01); *F02D 9/06* (2013.01)

(58) Field of Classification Search
CPC ........... F16K 1/22; F16K 1/221; F16K 1/224; F16K 1/225; F16K 7/0218; F02D 9/106; F16C 23/046; F16C 25/04; F16C 27/02
USPC ................. 251/304, 305, 306, 308, 366–367; 123/80 D, 190.1, 190.13, 190.14, 123/190.16, 337; 384/193, 215, 218, 219, 384/231–233, 265, 273
See application file for complete search history.

(56) References Cited

U.S. PATENT DOCUMENTS

| | | | | |
|---|---|---|---|---|
| 3,485,538 | A | * | 12/1969 | Nogle et al. ................... 384/215 |
| 3,774,879 | A | | 11/1973 | Zink |
| 3,991,974 | A | * | 11/1976 | Bonafous ....................... 251/306 |
| 4,022,424 | A | * | 5/1977 | Davis et al. .................... 251/214 |
| 4,877,339 | A | | 10/1989 | Schuster et al. |
| 5,632,304 | A | | 5/1997 | Kempka et al. |
| 6,022,000 | A | | 2/2000 | Laulhe et al. |
| 7,625,121 | B2 | * | 12/2009 | Pettinato et al. ................. 384/99 |

(Continued)

FOREIGN PATENT DOCUMENTS

| | | |
|---|---|---|
| DE | 1013117 B | 8/1957 |
| DE | 1751334 A1 | 7/1971 |
| DE | 2063369 A1 | 7/1972 |

(Continued)

*Primary Examiner* — Marina Tietjen
(74) *Attorney, Agent, or Firm* — Fishman Stewart Yamaguchi PLLC

(57) ABSTRACT

For a flap assembly, in particular an exhaust gas flap assembly, with the flap mounted on both sides via bearing devices in the housing, the disclosure describes a design in which a bearing body is supported radially against an annular collar of the bearing device and, by way of the annular collar, is held braced in a radially spring-loaded manner in a predefined radial position.

19 Claims, 2 Drawing Sheets

(56) References Cited

U.S. PATENT DOCUMENTS

| | | | |
|---|---|---|---|
| 2006/0048748 A1* | 3/2006 | Utz et al. ................ | 123/337 |
| 2007/0131889 A1 | 6/2007 | Unbehaun et al. | |

FOREIGN PATENT DOCUMENTS

| | | |
|---|---|---|
| DE | 2201834 A1 | 7/1973 |
| DE | 3707904 A1 | 9/1988 |
| DE | 3802243 A1 | 8/1989 |
| DE | 4426028 C1 | 11/1995 |
| DE | 19858626 C1 | 5/2000 |
| DE | 10157512 C1 | 7/2003 |
| DE | 10329336 A1 | 1/2005 |
| DE | 102004032856 A1 | 2/2006 |
| DE | 102004046077 A1 | 4/2006 |
| DE | 102007039003 A1 | 2/2009 |
| EP | 0835998 A1 | 4/1998 |
| EP | 1493951 A2 | 1/2005 |
| EP | 1571299 A2 | 9/2005 |
| EP | 1950393 A1 | 7/2008 |
| FR | 1435649 A | 6/1966 |
| GB | 2291954 A | 2/1996 |
| WO | WO-2006003017 A1 | 1/2006 |
| WO | WO-2008043429 A1 | 4/2008 |
| WO | WO-2010026100 A1 | 3/2010 |

* cited by examiner

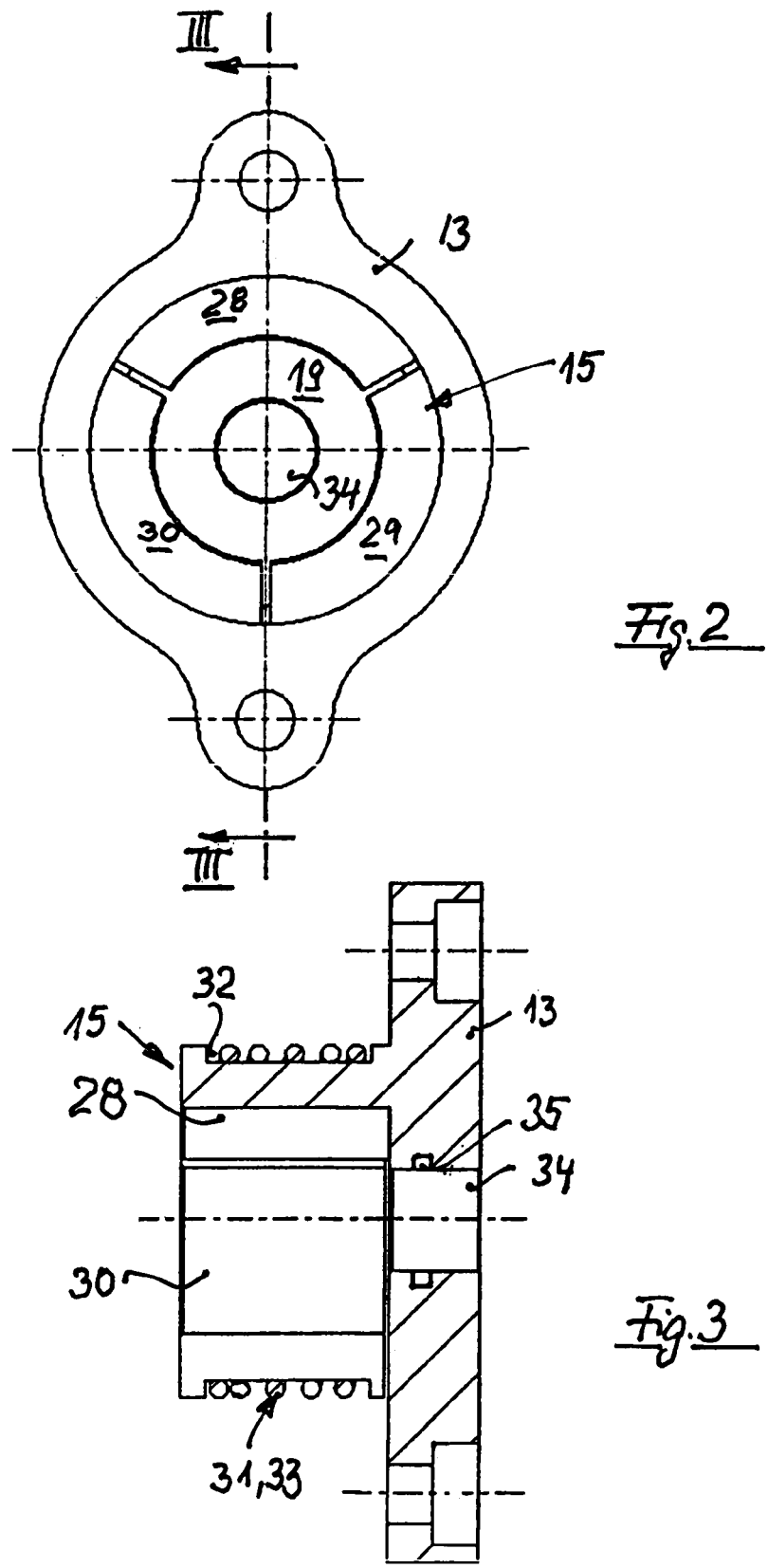

FLAP ASSEMBLY, IN PARTICULAR EXHAUST GAS FLAP ASSEMBLY

CROSS-REFERENCE TO RELATED APPLICATIONS

This application claims priority to German patent applications DE 10 2009 014 140.5 filed on Mar. 24, 2009 and PCT application PCT/EP2010/001646 filed on Mar. 16, 2010, which are hereby incorporated by reference in their entireties.

TECHNICAL FIELD

This disclosure relates to a flap arrangement, in particular an exhaust gas flap arrangement.

BACKGROUND

A flap arrangement as mentioned above is disclosed for instance in DE 37 07 904 A1. Relative to an arrangement with a flap positioned within the exhaust channel and a case-side bearing assembly positioned on one or both sides of the exhaust channel, it provides the development of a bearing assembly used to equalize temperature and manufacturing-related tolerances and deaxations for the shaft supporting the exhaust flap. For this purpose, the bearings of the shaft are rotatably arranged in at least one case-side annular collar protruding laterally relative to the exhaust channel in the direction of the shaft in at least one bearing box guided as a spherical bearing box in one part of the annular collar conically tapered toward the direction of the channel and attached axially spring-mounted in the direction of the exhaust channel. Due to the rotatable and axially displaceable guide of the shaft relative to the bearing box, the design of said bearing assembly requires a certain degree of radial play between the shaft and the cylindrical bore hole of the bearing box retaining the shaft, in particular in view of the working conditions. Said play cannot be equalized with the axial displaceability of the bearing box just as it cannot be equalized by the spherical support for the equalization of distortions and deaxations opposite the tapered part of the annular collar. In particular in connection with exhaust pulsations, this results in movements between the shaft and the bearing box, causing increased wear of the bearing as well as deflection of the bearing assembly.

An essentially similar situation exists with exhaust flap arrangements as they are disclosed in WO 2008/043429 A1.

SUMMARY

The object of the invention is to create an additional improved flap arrangement, in particular to design a flap arrangement as mentioned above in such a way that it is well manageable from a manufacturing-related point of view while still achieving satisfactory wear results even with large tolerances.

This is achieved with a flap arrangement of the kind mentioned above with the characteristics of claim 1. The subsequent claims describe convenient updated versions.

The invention of a flap arrangement, in particular an exhaust flap arrangement with pulsating gas flow feed is based on the assumption that the respective gas flap is guided and supported in a case-side bearing assembly by means of a bearing box, which is supported radially flexible, in particular spring-mounted on a predefined radial position. The flexible, in particular spring-mounted bracing of the bearing box on the predefined radial position makes it possible to guide the bearing box "without play," essentially floating, including under working conditions such as they are present for example for exhaust flaps, because the radially spring-mounted bracing at least in a radial direction achieves a flexibility in the support and guide of the bearing box with which dimensional changes due to the operation can be compensated; either with the bearing box being rotatable relative to the flap or rotating with the flap.

The radially flexible, in particular spring-mounted support on a predefined radial position is preferably a support on a central target position of the bearing box. According to the invention, this is in particular achieved with an annular collar of the bearing assembly, against which the bearing box is supported and springably braced on the circumference, wherein the annular collar is divided into separate annular sectors in the direction of the circumference, which are at least in part springably abutting radially against the bearing box. Within the scope of the invention, the annular collar can for instance be created with clamping claws originating from a common frame and radially springy form a retaining cage for the bearing box diagonally to their axial extension. Especially complementary, the claws can be pre-clamped to their common central position defined by the stabilized annular sector with a surrounding "spring cuff," wherein said "cuff" is formed with one or a plurality of annular springs, preferably with a surrounding coil spring.

The purpose of the invention is in particular also to specify a radial position as target position for the bearing box by means of the annular cuff in such a way that at least one of the annular sectors separated in the circumferential direction which are braced together radially springy forms a radially non-flexible support for the bearing box which the supporting body is positioned on by means of the radially springy and/or spring-mounted braced sectors of the annular cuff.

In said solution, at least one of the annular sectors of the annular cuff is a stabilized part of the bearing assembly, against which the bearing box is supported by means of other, radially spring-mounted annular sectors. Within the scope of the invention, said spring-mounted braced annular sectors can also be formed with separate elements, which are only kept together by the radially spring-mounted retaining clamping assembly and connected to form the annular cuff with the annular sector stabilized relative to the bearing assembly. In said solution, the annular sector stabilized relative to the bearing assembly forms the radial contact for the bearing box and at the same time the guide base for the other separate annular sectors connected by means of the radial bracing appliance with the annular sector representing the base. As a result, the annular cuff can virtually "breathe," and bulge to form the base in contrast to the stabilized annular sector within the scope of the required short regulating distances.

Within the scope of the invention, this is possible for both a cylindrical as well as a spherical contact area between the annular cuff and the bearing box. As a result, not only temperature-related dimensional changes can be equalized, but also manufacturing-related tolerances and axial errors within the corresponding dimensions can be adjusted.

It is basically within the scope of the invention that the bearing box is created as a single piece in relation to the respective gas flap. In particular with opposite positioning of the gas flap relative to the case of the flap component, the bearing box however preferably forms a rotatable component of the spherical bearing for the flap, in particular gas flap relative to the shaft of the flap. Said spherical bearing preferably comprises a spherical segment and a recess expanding toward the spherical segment and retaining the latter, wherein the spherical segment or the recess is provided on the bearing box. The spherical segment preferably forms an axially protruding part relative to the flap, in particular the gas flap, in the direction of the rotational axis, which is retained in the recess provided in the bearing box, wherein according to the invention the bearing box is axially springy braced opposite the supporting body of the bearing assembly supporting the annular cuff fixed relative to the case. This achieves a guide for the flap, in particular the gas flap that is immune against tolerances and operation-related contamination, said guide advantageously also allowing the arrangement and bracing of the shaft required to adjust the flap.

The result is a flap arrangement with a simple structure which is insensitive to tolerances and can be designed gastight, i.e., is easy to encapsulate.

BRIEF DESCRIPTION OF THE DRAWINGS

Other details and characteristics of the invention can be gathered from the claims, the description of the drawings and the figures. In the figures:

FIG. 2 shows an insulated and simplified illustration of the case-side bearing assembly in a view according to arrow II in FIG. 1, and FIG. 3 shows a cross-section III-III of the bearing assembly according to FIG. 2.

DETAILED DESCRIPTION

Figure 1:
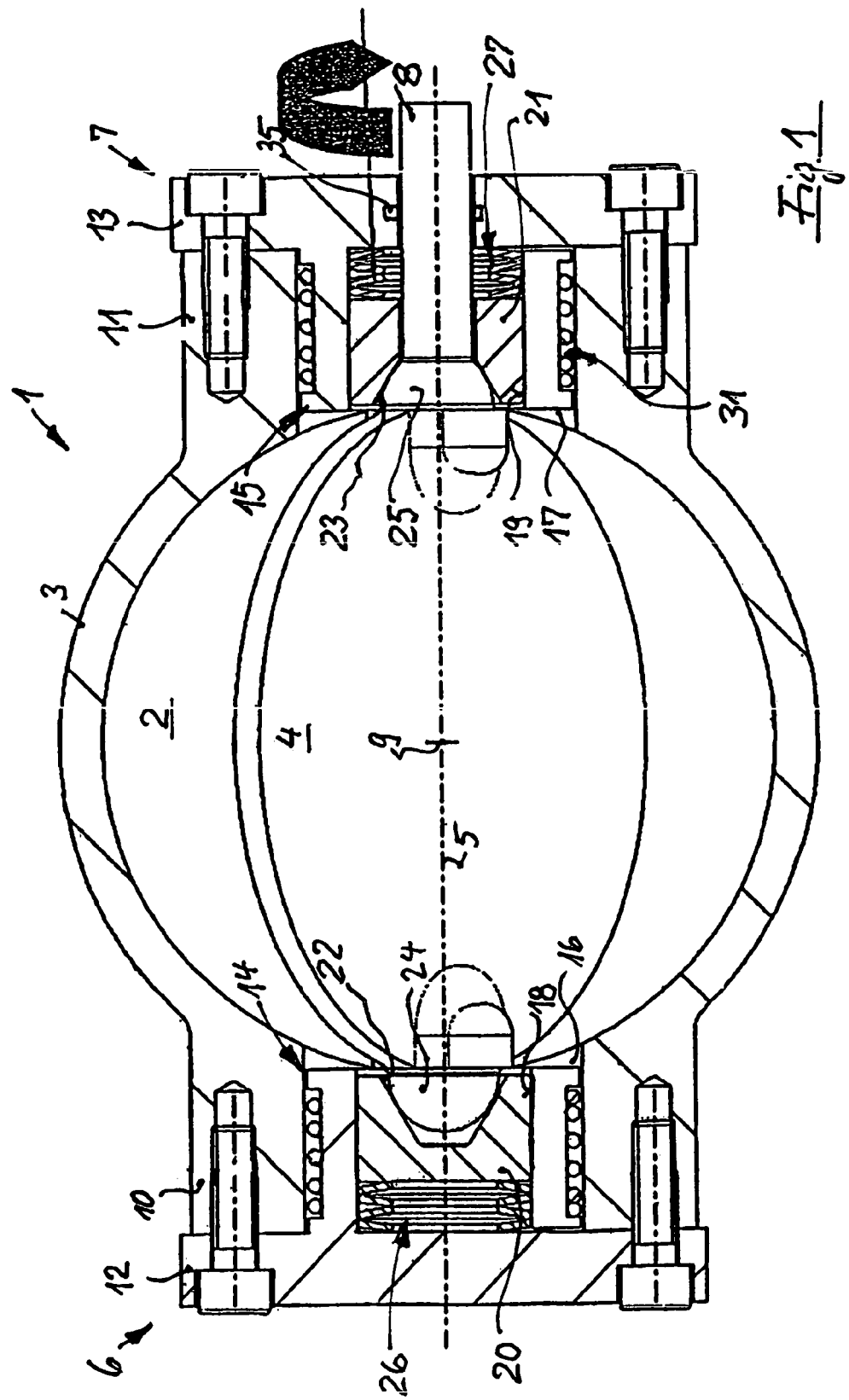
FIG. 1 shows a schematic cross-section of an exhaust flap arrangement.

In the cross-section of an exhaust flap arrangement 1 illustrated in FIG. 1, the case surrounding the exhaust channel 2 is labeled with the number 3. Exhaust channel 2 comprises flap 4 which is rotatable around an axis 5 extending across exhaust channel 2, routed on both sides of the exhaust channel 2 in the exemplary embodiment. Of the bearing assemblies 6, 7 provided for this purpose, the bearing assembly 7 is penetrated by the shaft 8 connected with the flap 4 extending toward the direction of the axis 5. The actuating drive for the flap 4 acts on said shaft in a manner not illustrated here. The shaft 8 penetrates a supporting body 13 in a passage opening 34, preferably sealed with a seal 35 (FIG. 2 and FIG. 3).

Said exhaust flap arrangement 1 is preferably provided for use in exhaust systems of motors, in particular diesel motors, used for stationary applications or in motor vehicles, in particular utility vehicles, such as for example as retarding flaps in exhaust brake systems or as reversing flaps in exhaust recycling systems.

The case 3 comprises concentric annular flanges 10, 11 relative to the axis 5 for retaining the bearing assemblies 6, 7 arranged opposite of each other in the direction of the axis 5 and therefore diagonally, in particular perpendicular to the longitudinal axis 9 of the exhaust channel 2. A lid-like supporting body 12, 13 of a bearing case is screwed down against said annular flanges on the face, said supporting body being equipped with an annular cuff 14, 15, which axially latches in to the respective intake opening 16, 17 of the annular flange 10, 11 in the direction of the axis 5. The respective annular cuff 14, 15 surrounds the bearing opening 18, 19 for a bearing box 20, 21 which has an open recess 22, 23 in the middle against the exhaust channel 2. A spherical segment 24, 25 such as in the shape of a spherical section or a spherical disk connected with the flap 4 latches into said recess. The respective bearing box 20, 21 is flexibly braced in the direction of said spherical segment 24, 25, in particular spring-loaded, wherein said spring load 26, 27 is created with a disk spring package in the exemplary embodiment.

In FIG. 1, only a segmented disk is provided as spherical segment 24, which is formed in particular with the bulging of the flap 4 around the edges. The correspondingly flattened spherical segment 24 is retained in the truncated cone-shaped recess 22. On the opposite side, the spherical segment 25 is formed as a spherical section and created by the end part of the shaft 8 allocated to flap 4 and connected to flap 4. The recess 23 retaining said end part is dome-shaped.

It is apparent in particular based on FIG. 2 and FIG. 3 that the respective annular collar, as shown for annular collar 15, is divided into annular sectors, three annular sectors 28 to 30 in the exemplary embodiment, of which the annular sector 28 is stabilized relative to the supporting body 13 as part of the annular collar 15 forming the bearing dish for the bearing box 21, is in particular formed as one piece together with the supporting body 13, while the annular sectors 29, 30 form parts of the bearing dish that are independent of the supporting body 13, said parts being supportingly and radially interlocked with the annular sector 28 stabilized relative to the supporting body 13 by means of a spring arrangement 31 against the bearing box 21. Similar to a spring cuff, the spring arrangement 31 comprises the annular sectors 28 to 30 on its outer circumference, wherein the spring arrangement 31 is defined axially relative to the annular cuff 15 in that it is positioned in an annular groove 32 of the annular cuff 15 on the circumference.

The exemplary embodiment illustrates a design of the spring arrangement 31 as a coil spring 33, which is axially abutting against the flanks of the annular groove 32, so that the annular sectors 29, 30 creating components that are independent and separate from the supporting body 13 of the annular cuff 15 are likewise axially fixed by means of the spring arrangement 31.

This design explained with respect to the bearing assembly 7 applies analogously to the bearing assembly 6. In both cases, the intake opening 16, 17 provided in the annular flange 10, 11 also has minor radial play for the respective annular cuff 14, 15, which is irrelevant in view of the bracing of the respective bearing box 20, 21, because the bearing box 20, 21 is braced radially play-free compared to the stabilized annular segment 28 relative to the respective supporting body 12 or 13 due to the radial restraint of the loose annular segments 29, 30.

An embodiment according to the invention in which the flap is connected as a single part with at least one of the respective bearing boxes, in particular the bearing box 20 not penetrated by the shaft 8 with respect to the exemplary embodiment, and is consequently not rotatably supported opposite the bearing box 20, but is in fact rotatable together with the bearing box 20, for which the retaining annular cuff 14 subsequently forms a bearing dish divided in circumferential direction with its annular sectors, is not illustrated in the figures.

The invention claimed is:

1. A flap arrangement with a case-side bearing assembly comprising a bearing box retained in an annular cuff,
   wherein the bearing box is braced radially resiliently in a predefined radial position by the annular cuff;
   wherein the annular cuff is divided into annular sectors separated in a circumferential direction, said annular sectors being radially resiliently clamped together.

2. The flap arrangement according to claim 1, wherein at least one annular sector is stabilized relative to the bearing assembly.

3. The flap arrangement according to claim 1, wherein the annular cuff comprises a supporting body of the bearing assembly.

4. The flap arrangement according to claim 3, wherein the annular cuff comprises at least one each of an annular sector stabilized relative to the supporting body and one radially mobile annular sector relative to the supporting body.

5. The flap arrangement according to claim 4, wherein the at least one radially mobile annular sector is radially elastically flexibly connected with the supporting body.

6. The flap arrangement according to claim 4, wherein the at least one radially mobile annular sector forms a separate component from the supporting body.

7. The flap arrangement according to claim 4, wherein the annular cuff comprises at least three annular sectors, one of which forms a one-piece part which is stabilized relative to the supporting body.

8. The flap arrangement according to claim 1, wherein the annular sectors are clamped together in a cuff-like fashion using a surrounding coil spring.

9. The flap arrangement according to claim 1, wherein the radial position of the bearing box relative to the annular cuff is defined by the at least one annular sector stabilized relative to a supporting body of the bearing assembly.

10. The flap arrangement according to claim 1, wherein the bearing assembly comprises spherical bearing assemblies, the bearing assemblies comprising a spherical segment and a recess expanding toward and retaining said spherical segment, of which the spherical segment or the recess is provided on the bearing box.

11. The flap arrangement according to claim 10, wherein the recess is on the bearing box in a dome-shaped design.

12. The flap arrangement according to claim 10, wherein the spherical segment is part of a shaft.

13. The flap arrangement according claim 1, wherein the flap arrangement includes a flap, wherein the flap is axially clamped down against the bearing assembly by clamping spring-loaded appliances in the direction of its axis.

14. The flap arrangement according to claim 13, wherein the annular cuff is a supporting body of the bearing assembly, and wherein the bearing box is braced against the supporting body by the spring-loaded appliances.

15. The flap arrangement according to claim 1, wherein at least one of the annular sectors is a separate piece independent from at least one of the other annular sectors.

16. The flap arrangement according to claim 15, further comprising a separate and independent element surrounding the annular sectors radially, the separate and independent element thereby radially resiliently clamping together the annular sectors.

17. The flap arrangement according to claim 16, wherein the element is a coil spring.

18. The flap arrangement according to claim 1, wherein a first one of the annular sectors forms a separate component from at least a second one of the annular sectors.

19. A flap arrangement with a case-side bearing assembly comprising a bearing box retained in an annular cuff,
wherein the bearing box is braced radially spring-loaded on a predefined radial position by the annular cuff;
wherein the annular cuff is divided into annular sectors separated in circumferential direction, said annular sectors being clamped together; and
wherein the annular sectors are clamped together in a cuff-like fashion using a surrounding coil spring.

* * * * *